(12) United States Patent
Lobo et al.

(10) Patent No.: US 6,930,874 B2
(45) Date of Patent: Aug. 16, 2005

(54) HIGH CURRENT CAPACITORS

(75) Inventors: Edward M. Lobo, Seymour, CT (US); Francis Mello, Acushnet, MA (US)

(73) Assignee: Parallax Power Components, LLC, Bridgeport, CT (US)

( * ) Notice: Subject to any disclaimer, the term of this patent is extended or adjusted under 35 U.S.C. 154(b) by 0 days.

(21) Appl. No.: 10/959,103

(22) Filed: Oct. 7, 2004

(65) Prior Publication Data

US 2005/0047058 A1 Mar. 3, 2005

Related U.S. Application Data

(63) Continuation of application No. 10/392,847, filed on Mar. 21, 2003, now Pat. No. 6,819,545.

(51) Int. Cl.[7] ................................. H01G 2/00
(52) U.S. Cl. .................. 361/272; 361/534; 361/303; 361/434
(58) Field of Search ................ 361/272, 278, 361/328, 329, 15–17, 534, 434, 535, 517–518, 301.3, 303, 308–310

(56) References Cited

U.S. PATENT DOCUMENTS

| | | |
|---|---|---|
| 4,090,226 A | 5/1978 | Fahlen et al. |
| 4,186,417 A | 1/1980 | Grahame |
| 4,283,750 A | 8/1981 | Deschanels et al. |
| 4,330,777 A | 5/1982 | McDuff |
| 4,580,189 A | 4/1986 | Dequasie et al. |
| 4,812,941 A | 3/1989 | Rice et al. |
| 4,897,761 A | 1/1990 | Lobo et al. |
| 4,922,364 A | 5/1990 | Paulsson |
| 5,019,934 A | 5/1991 | Bentley et al. ............ 361/15 |
| 5,138,519 A | 8/1992 | Stockman |
| 5,148,347 A | 9/1992 | Cox et al. .............. 361/272 |
| 5,831,148 A | 11/1998 | Marshall |
| 5,847,280 A | 12/1998 | Sherman et al. |
| 6,031,713 A | 2/2000 | Takeishi et al. .......... 361/517 |
| 6,064,559 A | 5/2000 | Church, Jr. |
| 6,106,969 A | 8/2000 | Lian et al. |
| 6,310,756 B1 | 10/2001 | Miura et al. ............ 361/301.3 |

FOREIGN PATENT DOCUMENTS

| | | |
|---|---|---|
| JP | 2-294011 | 12/1990 |
| JP | 4-101408 | 4/1992 |

*Primary Examiner*—Anthony Dinkins

(57) ABSTRACT

A capacitor including an expandable part fabricated on a capacitor housing is enclosed. The expandable part is expandable by a fault that occurs within the capacitor housing, thereby extending the capacitor housing to contact with an external interrupter. The external interrupter includes an external electrode and an external sensing circuit. The external sensing circuit detects a contact between the capacitor housing and the external electrode and sends a signal to disconnect the capacitor from an apparatus circuit.

20 Claims, 7 Drawing Sheets

(KNOWN ART)

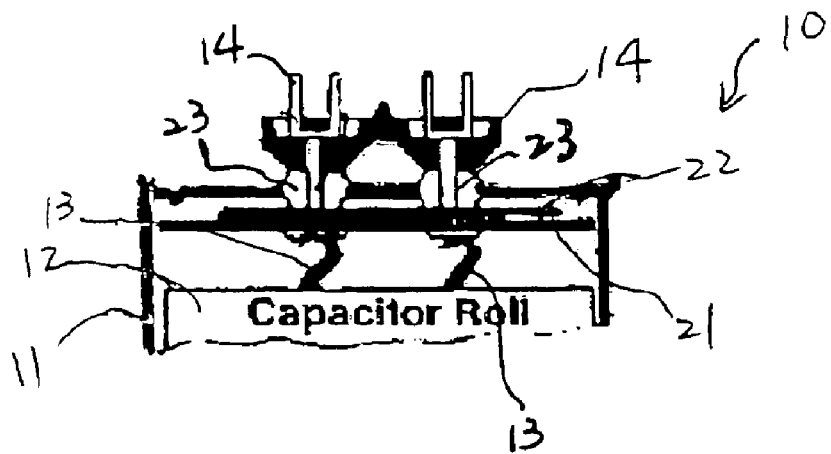
FIGURE 2A (KNOWN ART)
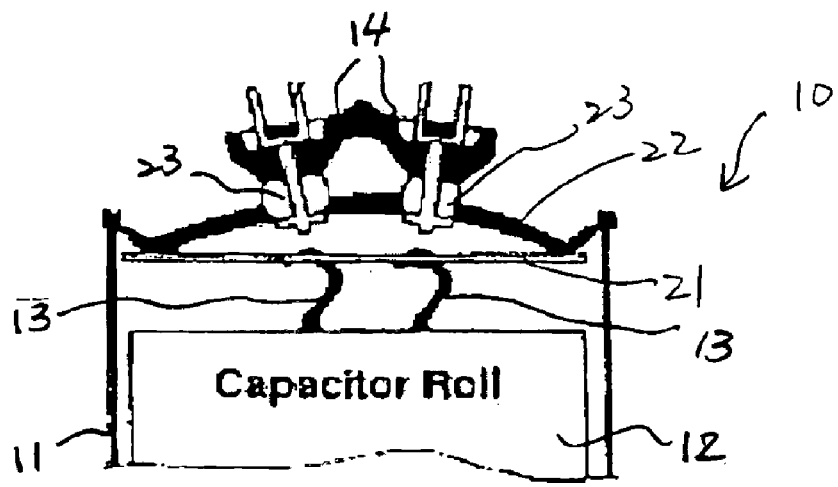
FIGURE 2B (KNOWN ART)

(KNOWN ART)

(KNOWN ART)

(KNOWN ART)

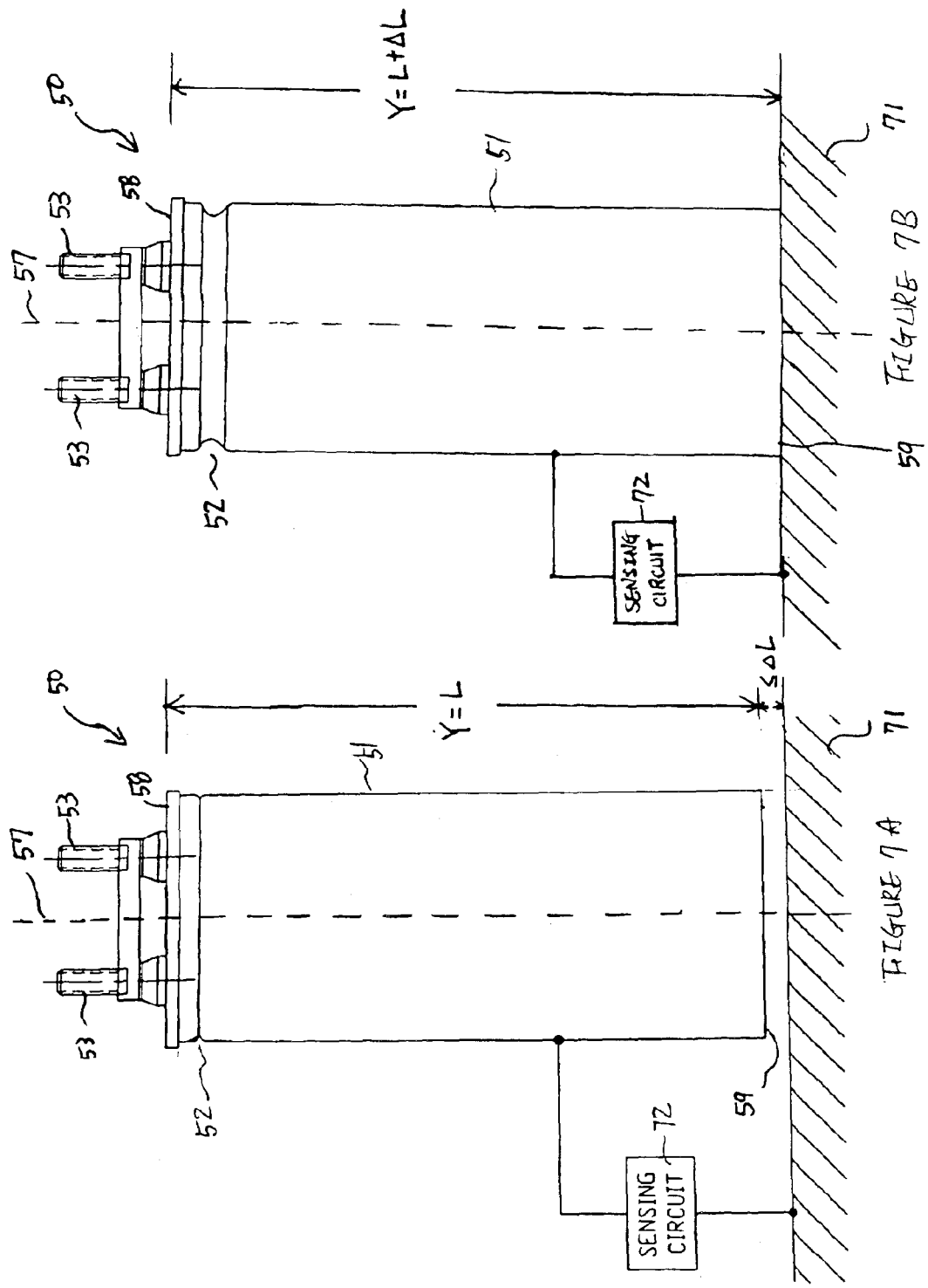

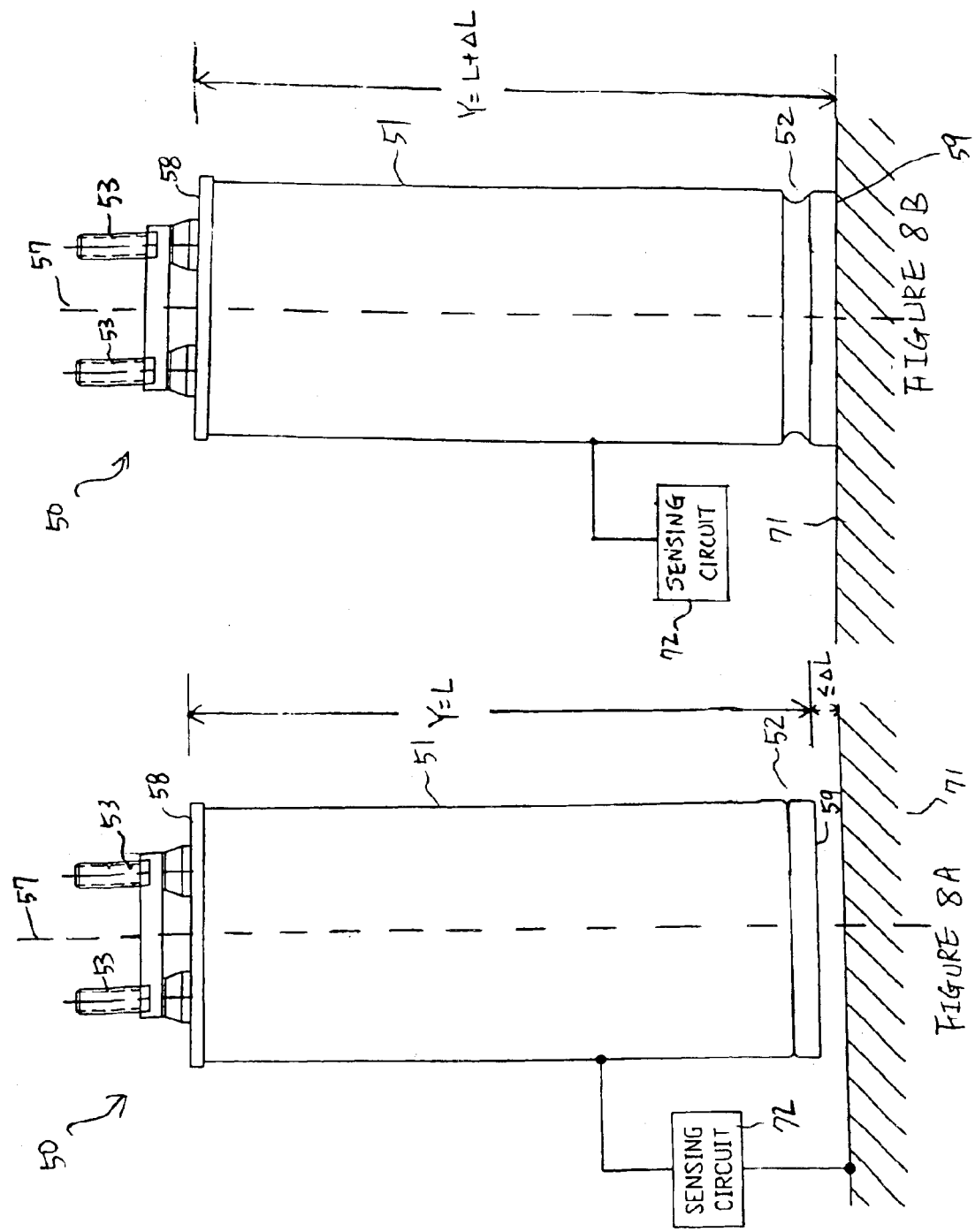

HIGH CURRENT CAPACITORS

This application is a continuation of U.S. patent application Ser. No. 10/392,847, filed Mar. 21, 2003 U.S. Pat. No. 6,819,545, which is herein incorporated by reference in its entirety.

BACKGROUND

1. Field of the Invention

The present invention generally relates to capacitors and, more particularly, to high current capacitors.

2. Background of the Invention

Capacitors are widely used in electrical apparatus for different reasons. For example, capacitors can be used to store electrical charge and to generate a large electrical current and voltage, and the like.

Capacitors can be manufactured using different methods. More recently, capacitors, such as a metallized film capacitors, can be manufactured by wrapping two tightly wound sheets or sections around a core. Each sheet is composed of a dielectric film having a metallized layer disposed on one face of the film. The metallized layer extends to one edge of the face to provide an unmetallized edge. The unmetallized edges of the two sheets are placed opposite to each other when the sheets are stacked and wound together, such that only one metallized edge is available for connecting to a leas at each end of the rolled capacitor. Each end is sprayed with a conductive metal that bonds with the sheet having a metallized edge at that end. Leads are then attached to each sprayed end to form the capacitor electrode. The rolled capacitor is then placed in a housing and impregnated with a dielectric fluid. One example of the metallized film capacitors is disclosed in U.S. Pat. No. 4,897,761.

The metallized film capacitor can be used in an apparatus that provides a large electrical current or that is operated under a large electrical power. In a high current applications, a fault that occurs within the capacitor can cause a disaster. For example, the apparatus can catch a fire due to the fault. In addition, the fault in the capacitor can damage other electrical components of the apparatus. Accordingly, the ability to detect faults that occurs within the capacitor has become an important issue in the design of high current capacitors.

FIG. 1 shows a general structure of a typical metallized film capacitor 10. As shown, capacitor 10 includes metal housing 11, capacitor roll 12 mounted within metal housing 11, and dielectric fluid 15 that is present between metal housing 11 and capacitor roll 12. Inside of metal housing 11, there are two leads 13, that connects the capacitor roll 12 to two external terminals 14. Terminals 14 are used to connect to other electrical components of an electrical apparatus to form an electrical circuit ("apparatus circuit"). Metal housing 11 can be in a cylindrical, an oval, a circular or other desired shape. As known in the art, capacitor 10 can be used singly in the electrical apparatus. Several capacitors 10 can also be used together as an array of capacitors to provide a larger electrical current.

In high current applications, safety measures must be provided to detect a fault that could occur within the capacitor. The fault may include, for example, a excessive pressure or overheat condition within the capacitor housing, which is caused by an overload of the capacitor. The overload may cause a fire to an apparatus circuit which includes the capacitor or the array of capacitors. Conventionally, an internal fault interrupter is installed within metal housing 11. The fault interrupter breaks when a fault occurs within capacitor 10, thereby disconnecting the capacitor 10 from the apparatus circuit.

FIGS. 2A and 2B show a conventional capacitor design that utilizes an internal fault interrupter. Such capacitor design is commonly used in the United States for AC capacitors.

With reference to FIGS. 2A and 2B, the internal fault interrupter is installed within metal housing 11 on the top of capacitor roll 12. Capacitor 10 includes insulating barrier 21 on which leads 13 are extended from capacitor roll 12 are welded. Capacitor 10 further includes a contact plate 22 that is set on the top of insulating barrier 21. The contact plate 22 is contacted with leads 13 on one side and with external terminals 14 on the other side. In this design, external terminals 14 are mounted on contact plate 22 by means of a rivet or a screw 23. When capacitor 10 is operated normally, contact plate 22 rests on insulation barrier 21 so that the contact plate 22 is in contact with both leads 13 and external terminals 14 to provide a electrical circuit. When a fault occurs within capacitor 10, the excessive pressure resulted from the fault forces contact plate 22 to expanded outwardly (or upwardly as depicted in FIG. 2B) to move away from leads 13. When contact plate 22 is expanded, it is no longer in contact with leads 13, resulting in a disconnection of the electrical circuit.

The capacitor shown in FIGS. 2A and 2B, however, is not suitable for providing greater than 15 amps RMS continuous duty. This is because a weak weld between insulation barrier 21 and leads 13 and the utilization of rivets 23 to mount terminals 14 on contact plate 22 are not capable of processing current greater than 15 amps.

FIGS. 3A and 3B illustrate another capacitor having an internal fault interrupter. Capacitor 10 as shown in FIG. 3A includes a bellows 31 that is fabricated on a top side of housing 11 and at least one "notched" wire conductor 33 within housing 11 which replaces conventional leads 13 for connecting external terminals 14 with capacitor roll 12. When capacitor 10 operates normally, bellows 31 maintains a non-expanded position as shown in FIG. 3A and notched wired conductor 33 properly connects capacitor roll 12 with external terminals 14. When an excessive pressure occurs resulted from a fault within capacitor 10, bellows 31 expands in an axial direction of housing 11. The expansion forces notched wire conductor 33 to be broken, as shown in FIG. 3B.

Although capacitor 10 shown in FIGS. 3A and 3B provides more current duty than that shown in FIGS. 2A and 2B, the current is still limited by notched wire conductor 33.

Capacitor 10 shown in FIG. 4 includes a high current interrupter. In FIG. 4, capacitor 10 includes bellows 41 fabricated on a top side of housing 11 and plug-type conductors 42 within housing 11. As shown, the top ends of plug-type conductors 42 connect to external terminals 14.

Connector 43 having a number of sockets 431 is attached to capacitor roll 12 which, when capacitor 10 operates normally (see dashed lines), receives the bottom ends of plug-type conductors 42 within sockets 431. In this manner, capacitor roll 12 is electrically connected with an apparatus circuit by external terminal 14. On the contrary, as shown by solid lines in FIG. 4, when a fault occurs within capacitor 10 resulting an excessive pressure inside capacitor 10, plug-like conductors 42 disengage from sockets 431 of connector 43 due to an expansion of bellows 41, thereby interrupting the electrical connection of 10 capacitor with the apparatus circuit.

The capacitor shown in FIG. 4 can be utilized in applications for a larger current duty. However, the capacitor is much more costly than any of the other designs mentioned above. Furthermore, all of the capacitors described above includes an internal interrupter located within the metal housing, which in itself is a significant manufacturing cost.

SUMMARY OF THE INVENTION

Accordingly, one object of the present invention is to provide a capacitor housing that can be easily manufactured for use in a high current capacitor.

The present invention also provides a low-cost capacitor without internal weak links that is capable of operating under high RMS current conditions.

One embodiment of the present invention provides a capacitor which includes a housing and an expandable part. The housing has a first end and a second end. The expandable part is located on the housing between the first end and the second end and is configured to expand due to a fault that occurs within the housing. The expansion of the expandable part causes the housing to extend in length to make contact with an external interrupter.

Another embodiment of the present invention provides a capacitor which includes a housing, an expandable part, an external electrode and an external sensing circuit. The housing has a first end and a second end. The expandable part is located on the housing which is expandable by a high pressure resulted from a fault occurred within the housing. The external electrode is located at a position close to, but not in contact with the housing when the capacitor is operated normally. When a fault occurred within the capacitor, the housing is extended by the expandable part to make a contact with the external electrode to complete the external sensing circuit.

Another embodiment of the present invention provides a electrical system which includes at least one capacitor device, an external electrode device and a external sensing circuit. The at least one capacitor device includes a housing having a first end and a second end and an expandable part fabricated on the housing which is expandable by a fault occurred within the housing. The external sensing circuit device is coupled between the housing and the external electrode device for sensing a contact between the housing and the external electrode device. The external electrode device is located at a position close to, but not contact with the housing of the capacitor device when the capacitor is operated normally. When a fault occurs within the housing, the external electrode device contacts with the housing of the capacitor device.

Another embodiment of the present invention provides a capacitor which includes a housing, an expandable part and an electrical contact. The housing has a top end and a bottom end which are separated from each other by a distance. The expandable part is disposed on the housing between the top end and the bottom end and is configured to increase the distance when a pressure within the housing increases. The electrical contact is disposed on one of the top end and the bottom end and is configured to complete an external circuit when the distance is increased.

Another embodiment of the present invention provides a electrical system which includes a capacitor and an external interrupter. The capacitor includes a housing, an expandable part and an electrical contact. The housing has a top end and a bottom end which are separated from each other by a distance. The expandable part is disposed on the housing between the top end and the bottom end and is configured to increase the distance when a pressure within the housing increases. The electrical contact is disposed on one of the top end and the bottom end and is configured to complete an external circuit when the distance is increased. The external interrupter is configured to cutoff power supply to the capacitor when the external circuit is completed by the electrical contact of the capacitor when the distance is increased.

BRIEF DESCRIPTION OF THE DRAWINGS

FIG. 2A is a cross-sectional diagram of a first conventional capacitor, showing the capacitor during a normal status.

FIG. 2B is a cross-sectional diagram of the first conventional capacitor of FIG. 2A, showing the capacitor during a fault status.

FIG. 7A is a schematic diagram of a capacitor in accordance with another embodiment of the present invention, showing the capacitor during a normal status.

FIG. 7B is a schematic diagram of the capacitor of FIG. 7 showing the capacitor during a fault status.

FIG. 8A is a schematic diagram of a capacitor in accordance with another embodiment of the present invention, showing the capacitor during a normal status.

FIG. 8B is a schematic diagram of the capacitor of FIG. 8A showing the capacitor during a fault status.

DETAILED DESCRIPTION OF THE PREFERRED EMBODIMENTS

In one aspect, the present invention provides a capacitor that is configured to trigger an external interrupter. The use of the external interrupter overcomes the disadvantages of the conventional capacitor having an internal interrupter, which typically involves a weak connection in the conductor that can be unnecessarily broken. Using the external interrupter, a capacitor of the present invention can be designed for heavy currents up to or exceeding 50 amps RMS.

A preferred embodiment of the present invention includes an expandable part in a capacitor housing. The expandable part can be fabricated to resemble a bellows. There is no internal pressure interrupter within the housing of the capacitor. When a fault occurs within the capacitor, the housing increases in length. The increased length of the housing is utilized to make contact with an external circuit. The completion of the external circuit then signals an electrical breaker or contractor to disconnect the capacitor from a power source to prevent the capacitor from further expansion and/or rupture. Utilization of the external interrupter makes it possible for capacitors of the present invention to be used in a high current apparatus. Accordingly, the safety of the apparatus can be greatly increased.

Figure 5:
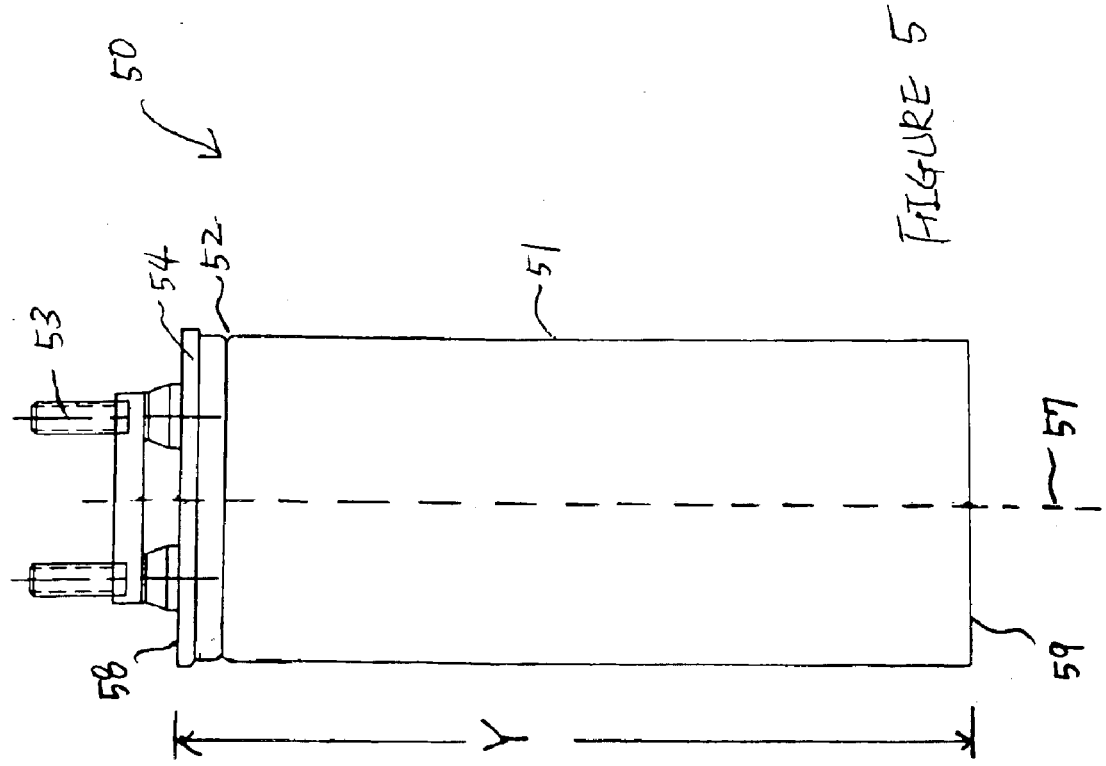
FIG. 5 is a schematic diagram of a capacitor in accordance with one embodiment of the present invention, in which a housing of the capacitor includes an expandable part.

FIG. 5 illustrates an embodiment of the present invention. Capacitor 50 includes housing 51 which includes expandable part 52. Capacitor 50 may be a metallized film capacitor. Housing 51 may be made of metal. Although the following discussion describes the invention in the context of a metallized film capacitor, it is noted that the present invention is not limited to applications in metallized film capacitors.

Figure 1:
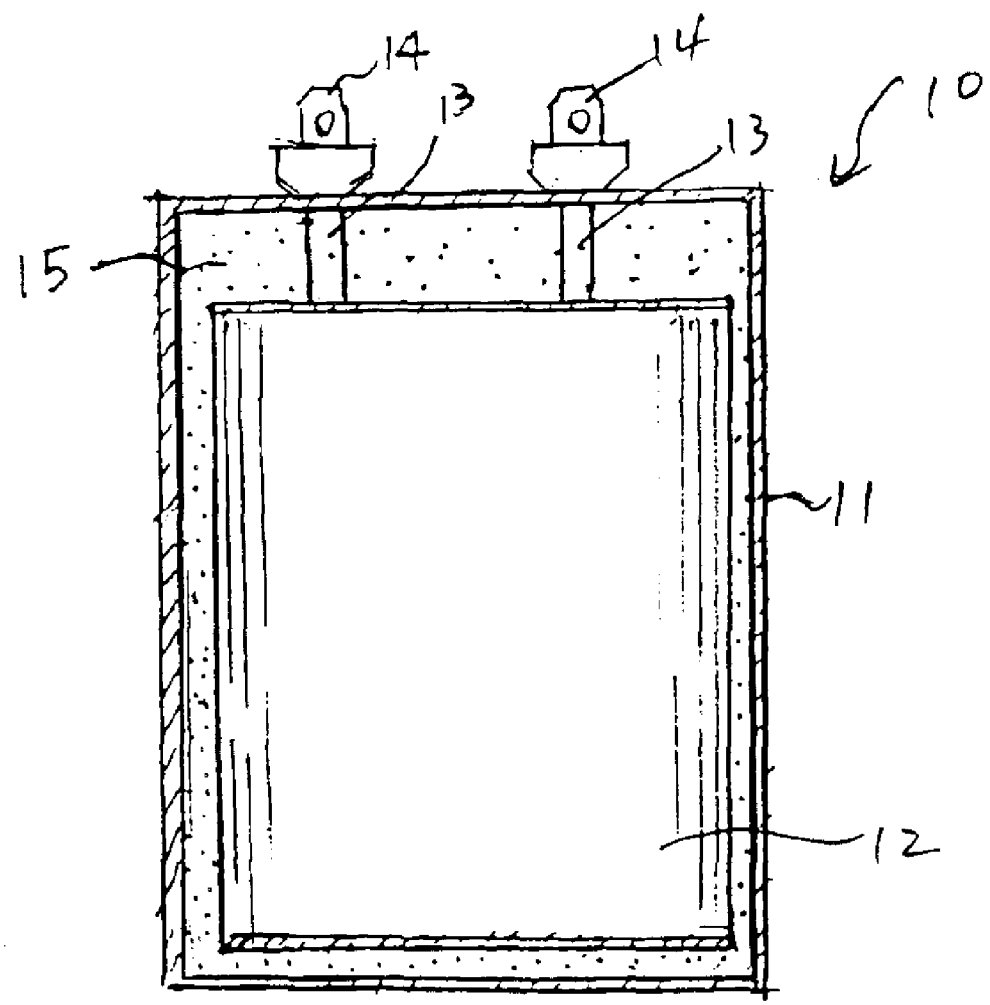
FIG. 1 is a cross-sectional diagram of a known metallized film capacitor.
Figure 3B:
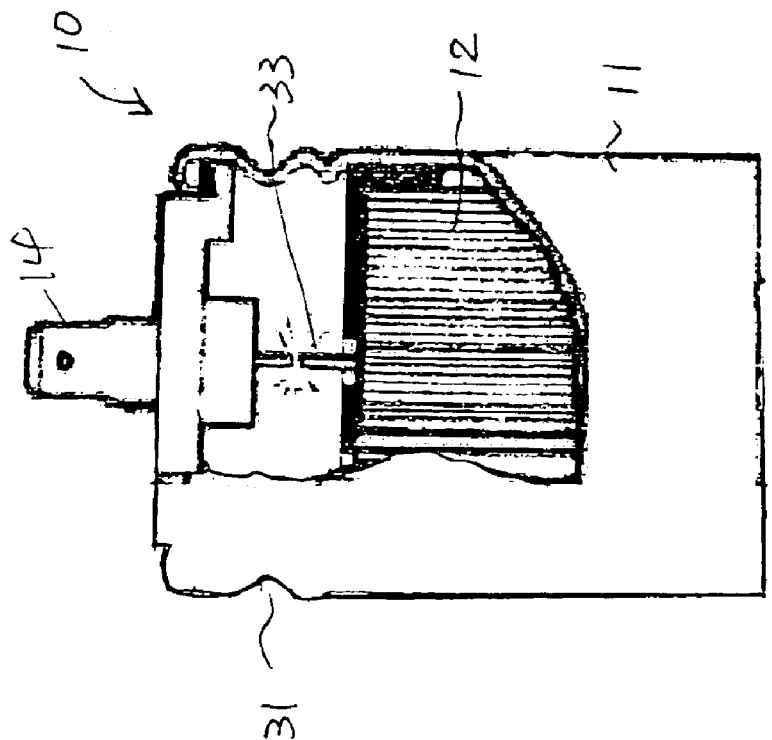
FIG. 3B is a cross-sectional diagram of the second conventional capacitor, showing the capacitor during a fault status.
Figure 3A:
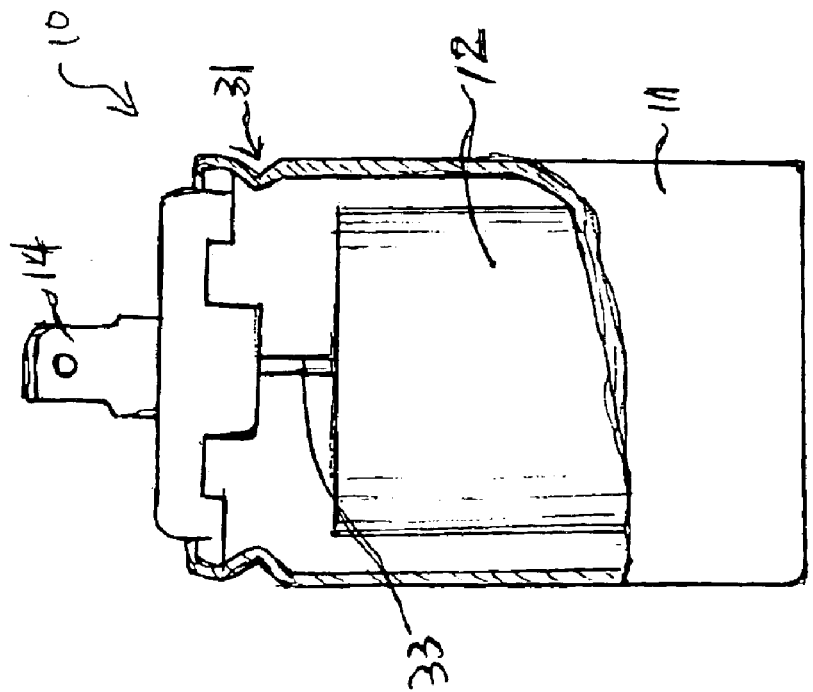
FIG. 3A is a cross-sectional diagram of a second conventional capacitor, showing the capacitor during a normal status.
Figure 4:
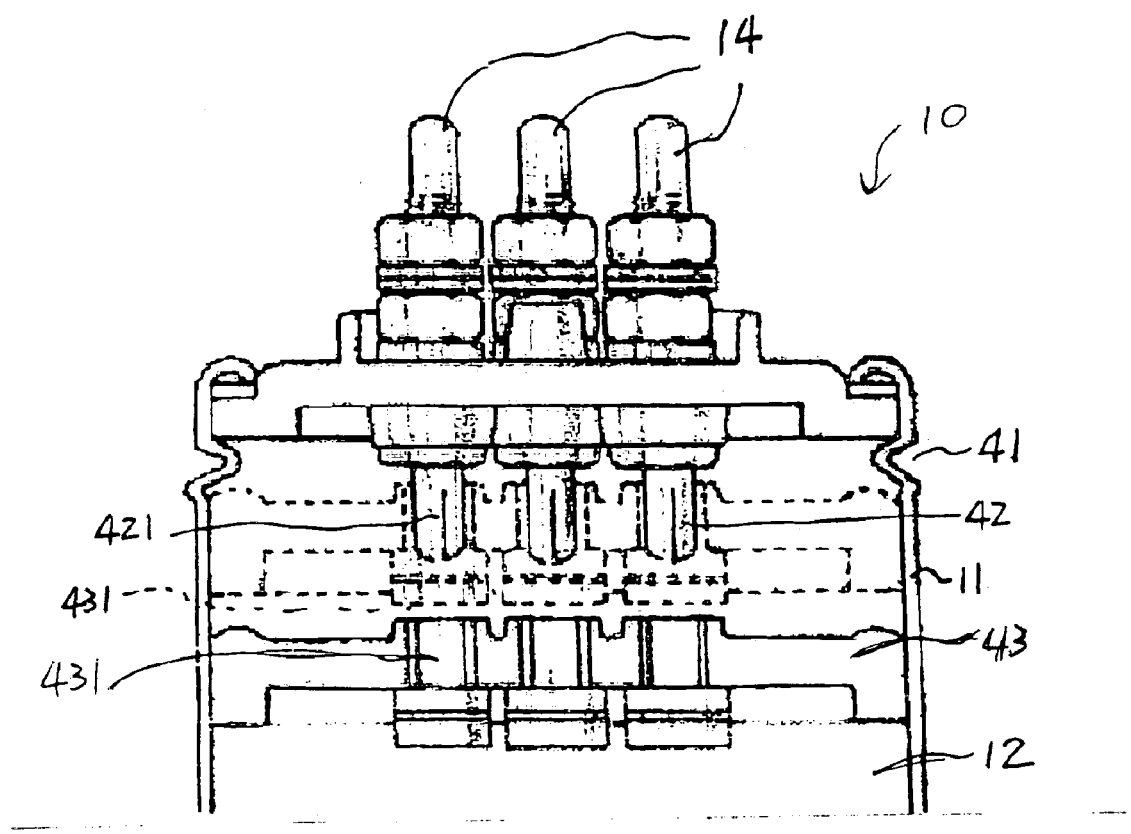
FIG. 4 is a cross-sectional diagram of a third conventional capacitor.

Capacitor 50 further includes a capacitor roll (not shown in FIG. 5). The capacitor roll is similar to capacitor roll 12 shown in FIG. 1. Metal housing 51 is filled with a dielectric fluid. The dielectric fluid can be, for example, a type of oil.

Two external terminals 53 are disposed on top cover 54 of capacitor 50. An internal end of each of terminals 53 is connected with the capacitor roll. An external end of each of external terminals 53, which is exposed outside of housing 51, is used to connect to other components of an electrical apparatus to complete an apparatus circuit. Unlike conventional capacitors with internal pressure interrupters, capacitor 50 of the present invention does not include any internal interrupter.

Expandable part 52 is configured to expand in length when a fault occurs within capacitor 50. The fault within capacitor 50 can be resulted from, for example, a short circuit or an overload of the capacitor, which causes a excessive pressure or a an overheat to occur within capacitor 50. When capacitor 50 is operated normally (i.e., during a normal status), expandable part 52 is in a non-expanded position, as shown in FIG. 5. In the non-expanded position, a distance between top end 58 and bottom end 59 of housing 51 is represented as distance Y, as depicted on FIG. 5. In the non-expended position, Y=L. When the fault occurs within capacitor 50, however, expandable part 52 expands and distance Y increases by $\Delta L$, resulting in a total distance of Y=L+$\Delta L$. As expandable part 52 is attached to metal housing 51, the expansion of expandable part 52 also forces metal housing 51 to move in axial direction 57. More details will be described with reference to FIGS. 7A–7B and 8A–8B below.

Figure 6:
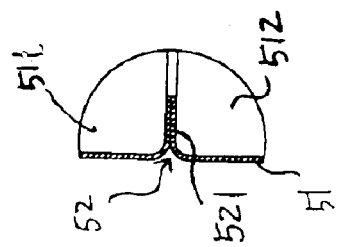
FIG. 6 is a enlarged view of the expandable part of FIG. 5.

FIG. 6 is an enlarged view of expandable part 52 of FIG. 5. As shown, expandable part 52 has a structure similar to a bellows which is fabricated on housing 51. Expandable part 52 includes a fold 521 on a joint between upper housing 511 and lower housing 512 of housing 51. The fold 521 is expandable in length in axial direction 57 when a pressure resulted from a fault occurred within capacitor 50. As depicted in FIG. 6, expandable part 52 is integrally fabricated on metal housing 51. It is noted that expandable part 52 can be a separate element attached to metal housing 51 in a sealed manner in other embodiments of the invention.

In operation, capacitor 50 is set on a position close to an electrode plate so that when the expandable part 52 expands, bottom end 59 of metal housing 51 makes a contact with the electrode plate so that an electrical circuit between metal housing and the electrode plate is completed. The electrical circuit can then be used, for example, to cutoff current from entering capacitor 50.

FIGS. 7A and 7B illustrate another embodiment of the present invention in which capacitor 50 is located at a position close to an electrode plate 71 such that when expandable part 52 expands, metal housing 51 makes contact with electrode plate 71. The electrode plate 71 is preferably made of metal. As described above, when a fault occurs within capacitor 50, expandable part 52 expands in length (e.g., by $\Delta L$) due to a high pressure buildup within housing 51 resulted from the fault. The increased length (i.e., Y=L+$\Delta L$) causes bottom end 59 of metal housing 51 to make contact with electrode plate 71. Sensing circuit 72, which is coupled to metal housing 51, detects a connection between metal housing 51 with electrode plate 71. As housing 51 and electrode pate 71 are both made of metal, the contact of metal housing 51 with electrode 71 completes sensing circuit 72, which is different from the apparatus circuit.

Once sensing circuit 72 detects the connection, it sends a signal to a circuit breaker (not shown) which may be part of the electrical apparatus of which capacitor 50 is a component or part of a separate safety controlling device. The circuit breaker then disconnect capacitor 50 from the apparatus circuit. In this manner, no current will be flowing through capacitor 50 and further expanding and/or rupturing of metal housing 51 is prevented. This in turn avoids a fire from occurring in capacitor 50 or elsewhere within the electrical apparatus.

FIG. 7A shows that expandable part 52 is at a non-expanded position, which means capacitor 50 is operated normally. In this case, metal housing 51 maintains at a first position (i.e., Y=L) at which bottom end 59 is close to but not touching electrode plate 71. Since no contact between metal housing 51 and electrode plate 71 is made, no signal is detected by sensing circuit 72. Therefore, no signal is sent to the circuit breaker to disconnect the connection of capacitor 50 from the apparatus circuit.

When a fault within capacitor 50 occurs, expandable part 52 expands due to the high pressure generated within capacitor 50, which force metal housing 51 to extend in axial direction 57 to a second position (i.e., Y=L+$\Delta L$), which is as shown in FIG. 7B. At the second position, bottom end 59 of metal housing 51 makes contact with electrode plate 71. The contact then activates sensing circuit 72 to send a signal to the circuit breaker. In turn, the circuit breaker disconnects capacitor 50 from the apparatus circuit and no current flows through capacitor 50.

FIGS. 8A and 8B illustrate another embodiment of the present invention. In the embodiment shown in FIG. 7A, expandable part 52 is installed on a upper end of metal housing 51. Expandable part 52 can alternatively be installed on a lower end of metal housing 51, as shown in FIGS. 8A and 8B. The installation can be done integrally or separately. Expandable part 52 can also be placed at any position between the top end 58 and bottom end 59.

Similar to the embodiment with reference to FIGS. 7A and 7B, bottom end 59 of metal housing 51 is movable between the first position (Y=L, as shown in FIG. 8A), and the second position (Y=L+ΔL, as shown in FIG. 8B), where expandable part 52 expands by ΔL due to a fault within capacitor 50 so that metal housing 51 extends bottom end 59 to touch electrode plate 71. As described above, sensing circuit 72 then sends a signal to activate the circuit breaker to disconnect capacitor 50 from the apparatus circuit.

In addition to the specific implementation shown in FIGS. 7A and 8A, expandable part 52 can be installed at any location of metal housing 51, as long as the expansion is able to move bottom end 59 of metal housing 51 to touch electrode plate 71. The locations of metal housing 51 and electrode plate 71 should be arranged in a manner that when capacitor 50 is overloaded, metal housing 51 is moveable to make contact with electrode plate 71.

Sensing circuit 72 may be a low-cost ground fault sensor or simply a continuity detection circuit. Sensing circuit 72 may also be a weight/pressure-sensing device which is activated when sensing a weight or pressure of capacitor 50 on electrode plate 71. In this embodiment, electrode plate 71 is not necessarily made of metal and sensing circuit 72 needs only be coupled with electrode plate 71 without being coupled with metal housing 51. Electrode plate 71 can also function as a trigger which triggers sensing circuit 72 when it makes a physical contact with capacitor 50.

The present invention may be easily implemented in an application in which banks of multiple capacitors are utilized in apparatus such as UPS (Uninterrupted Power System) or power factor correction systems. In these embodiments, the banks of multiple capacitors are located at a first position close to but not in contact with a single electrode plate (such as electrode plate 72) or multiple electrode plates each of which corresponds to each of the multiple capacitors. When all the multiple capacitors are operated normally, the banks of multiple capacitors are maintained at their first position. However, when one of the multiple capacitors operates abnormally (e.g., a fault has occurred), this capacitor housing is moved by the expansion of an expandable part (such as expandable part 52) to make contact with corresponding electrode plate (at a second position). At this time, a signal is activated by a sensing circuit (such as sensing circuit 72) that enables the circuit breaker to disconnect the banks of multiple capacitors from the apparatus circuit. Accordingly, even a single fault occurred from only one capacitor among multiple capacitors will cause the UPS system to be turned "OFF" before the capacitor with fault is actually ruptured to spew its charred contents throughout the entire system.

Moreover, the present invention includes expandable part 52 on metal housing 51 without any additional materials. According to the present invention, the only added cost to capacitor 50 is the operation to fabricate the expandable part 52 into metal housing 51. This added cost to the fabrication is minuscule compared to the cost of manufacturing capacitor 50 itself.

The present invention may be implemented in different types of capacitors, such as metal cased electrolytic capacitors. The present invention can also be applied to any electronic elements, that include metal housings with an expandable portion in response to an abnormal situation, such as an overload, an overheat and an excessive pressure.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A capacitor, comprising:
   a housing configured to extend from a first position to a second position when a fault occurs within the capacitor,
   wherein in the first position, the housing is not in contact with a sensing surface of an external interrupting circuit,
   wherein in the second position, the housing comes into contact with the sensing surface of the external interrupting circuit.

2. The capacitor of claim 1, wherein the fault within the housing is associated with one of overload, overheat and excessive pressure.

3. The capacitor of claim 1, wherein the housing further comprises an expandable part that extends when the fault occurs within the capacitor.

4. The capacitor of claim 3, wherein the expandable part is located near one end of the housing.

5. The capacitor of claim 3, wherein the expandable part is located near a middle portion of the housing.

6. The capacitor of claim 1, wherein the housing includes a bellow-shaped part that is expandable when the fault occurs within the capacitor.

7. The capacitor of claim 1, wherein when the housing comes into contact with the sensing surface of the external interrupting circuit, the external interrupting circuit sends a turn-off signal to a power supply of the capacitor.

8. The capacitor of claim 1, further comprising a dielectric fluid filled within the housing.

9. A capacitor, comprising:
   a housing comprising a first end and a second end; and
   an expandable part located on the housing between the first end and second end, the expandable part expands when a fault occurs within the capacitor,
   wherein the housing does not come into contact with a sensing surface of an external interrupting circuit during normal operation of the capacitor,
   wherein the housing comes into contact with the sensing surface of the external interrupting circuit when the fault occurs.

10. The capacitor of claim 9, wherein the expansion of the expandable part causes the housing to extend along an axis of the housing.

11. The capacitor of claim 9, wherein the fault within the housing is associated with one of overload, overheat and excessive pressure.

12. The capacitor of claim 9, wherein the expandable part is fabricated integrally with the housing.

13. The capacitor of claim 9, wherein the expandable part is fabricated separately from the housing.

14. A safety control device for an electrical component, comprising: a capacitor, comprising;
   a housing, wherein the housing is configured to include an expandable part that is located on the housing between a first end of the housing and a second end of the housing; and
   an external interrupter electrically coupled to the housing, wherein the external interrupter includes a sensing surface and a triggering element, the sensing surface is located at a position close to but not in contact with the housing when the capacitor operates normally, the triggering element is electrically coupled with a power source that provides electrical power to the capacitor,
   wherein when a fault occurs within the capacitor, the expandable part expands such that the housing comes into contact with the sensing surface of the external interrupter, resulting in the triggering element to send a signal to the power source to cut off power to the capacitor.

15. The device of claim 14, wherein the capacitor housing is expanded axially when the fault occurs.

16. The device of claim 14, wherein the expandable part is fabricated integrally with the housing.

17. The device of claim 14, wherein the expandable part is fabricated separately with the housing.

18. The device of claim 14, wherein the fault within the housing is associated with one of overload, overheat and excessive pressure.

19. The device of claim 14, wherein the expandable part is located near one end of the housing.

20. The device of claim 14, wherein the expandable part is located near a middle portion of the housing.

* * * * *